April 11, 1967   R. A. COLWELL   3,313,556
TRAILER VEHICLE CONSTRUCTION
Filed March 19, 1964   7 Sheets-Sheet 1

INVENTOR.
ROY A. COLWELL
BY
Learman, Learman & McCulloch
ATTORNEYS

April 11, 1967 R. A. COLWELL 3,313,556
TRAILER VEHICLE CONSTRUCTION
Filed March 19, 1964 7 Sheets-Sheet 5

INVENTOR
ROY A. COLWELL
BY
Learman, Learman & McCulloch
ATTORNEYS

April 11, 1967 R. A. COLWELL 3,313,556
TRAILER VEHICLE CONSTRUCTION
Filed March 19, 1964 7 Sheets-Sheet 6

INVENTOR.
ROY A. COLWELL
BY
*Learman, Learman & McCulloch*
ATTORNEYS

United States Patent Office 3,313,556
Patented Apr. 11, 1967

3,313,556
TRAILER VEHICLE CONSTRUCTION
Roy A. Colwell, Saginaw, Mich., assignor to Saginaw Products Corporation, Saginaw, Mich., a corporation of Michigan
Filed Mar. 19, 1964, Ser. No. 353,150
22 Claims. (Cl. 280—445)

This invention relates to trailer vehicles and more particularly to a trailer construction having great versatility and flexibility in use.

Some trailer vehicles known heretofore have had vertically adjustable load supports, others have had selectively steerable and non-steerable wheels, and still others have had yieldable wheel suspension means. It is fairly common for trailers to have wheel brakes, and some trailers have brake actuating means that function automatically under certain circumstances to apply the brakes. Moreover, some trailer constructions have separable towbar means for use in connecting the trailer to a towing vehicle or to another trailer. In some instances several of the foregoing characteristics have been combined in a single trailer. So far as is known, however, no single trailer construction heretofore has included all of these attributes.

One of the principal objects of this invention is to provide a trailer construction having all of the foregoing characteristics.

Another object of the invention is to provide a trailer vehicle having torsion bar wheel suspension means and wherein the suspension means forms part of apparatus for raising and lowering the vehicle load supporting bed.

A further object of the invention is to provide a trailer of the kind referred to having selectively steerable and non-steerable wheels.

Another object of the invention is to provide a wheeled trailer of the kind described having brakes and wherein brake operating means is operable automatically to apply the brakes or may be disabled from applying the brakes.

A further object of the invention is to provide detachable towbar means for a wheeled trailer having brakes and wherein the operation of the brakes is controlled by or independently of the towbar.

Another object of the invention is to provide a detachable towbar for a vehicle of the kind described and wherein detachment of the towbar does not interfere with operation of the vehicle's brakes.

A further object of the invention is to provide a trailer vehicle which may be towed from either end and which may form part of a train of similar vehicles.

Other objects and advantages of the invention will be pointed out specifically or will become apparent from the following description when it is considered in conjunction with the appended claims and the accompanying drawings, in which:

A trailer vehicle constructed in accordance with the invention is represented generally by the reference character 1 and comprises a pair of wheeled units 2, each of which is the same, the units 2 being arranged in spaced apart, tandem relation and being secured in a manner subsequently to be described to a pair of load supporting chassis members 3.

Each of the wheeled units 2 comprises a transverse frame member 4, hereinafter referred to as the rear frame member, and a parallel, spaced frame member 5 that hereinafter will be referred to as the forward frame member. At each end of the rear frame member 4 is welded or otherwise suitably secured a mounting plate or bracket 6 to which the members 3 are bolted or otherwise fixed. At each end of the frame member 5 is bolted or otherwise suitably secured a box-shaped support member 7 (see FIGURE 6) that is provided at its upper end with a mounting plate 8 (FIGURES 1–4) to which the members 3 are bolted or otherwise suitably secured. The forward frame member 5 includes a forwardly projecting extension 9 that terminates in an arcuate, forwardly convex latch plate 10 (see FIGURES 3, 5, 6 and 8), the purpose of which will be explained hereinafter in connection with the description of the wheel steering mechanism.

Between the front and rear frame members of each unit 2 and at opposed sides of the latter is mounted a pair of wheel journaling assemblies 11, each of which is identical. Each wheel journaling assembly comprises a flanged disk 12 (see especially FIGURE 4) at the center of which is fixed a spindle 13. Rotatably journaled on the spindle 13 is a wheel 14 having a rubber or other tire 15 at its outer periphery. Surrounding the hub of the wheel 14 is a number of anchor pins 16 on which is mounted a plurality of spaced apart brake disks 17 so as to be rotatable with the wheel, but movable axially of the wheel. Mounted on the flanged disk 12 and interleaved between the brake disks 17 is a plurality of segment-shaped plates 18. The plates 18 are adapted to react between adjacent brake disks 17 and with a retaining ring 19 carried by the flanged disk 12 for selectively enabling and disabling rotation of the wheel 14. The brake construction described herein is simiuar to that disclosed in co-pending application Serial No. 303,534, filed August 21, 1963, and to which reference may be had for a more detailed disclosure of the manner in which the brake disks and plates are arranged.

Fixed on the flanged disk 12 of each wheel assembly is a steering knuckle 20 in which is mounted a kingpin 21 by means of which the wheel is swivelable about a substantially vertical axis.

Figure 5:
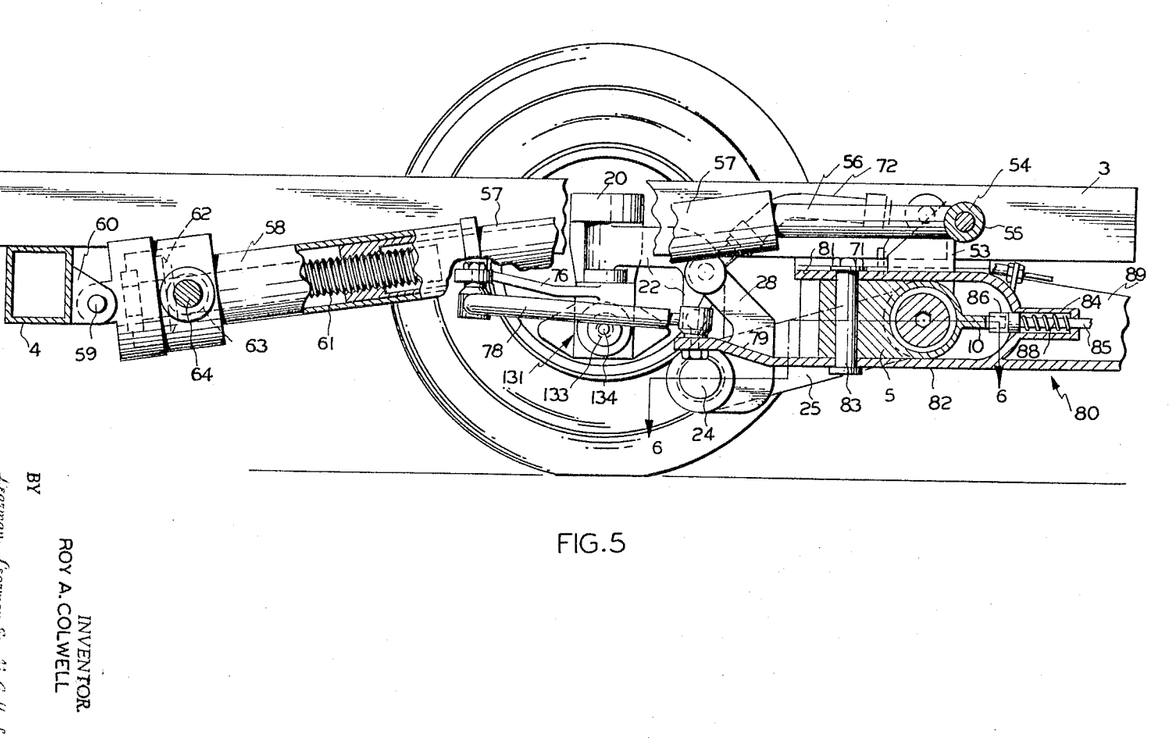
FIGURE 5 is an enlarged, longitudinal, partly sectional view taken on the line 5—5 of FIGURE 2.
Figure 8:
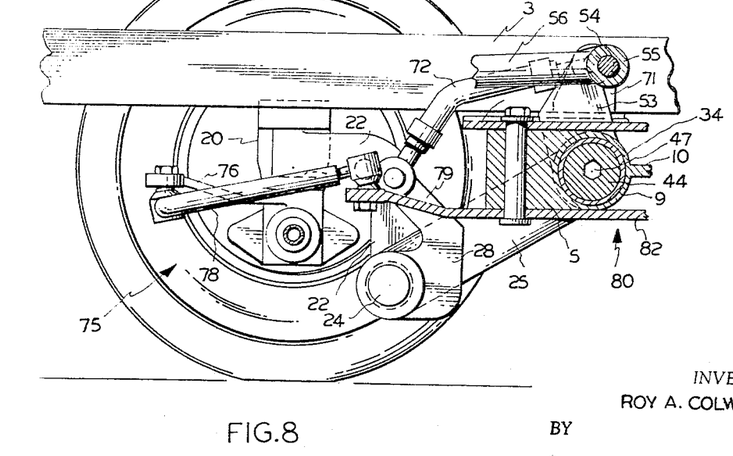
FIGURE 8 is a view similar to FIGURE 5, but illustrating the parts in adjusted positions.

Each wheeled unit 2 is equipped with a torsion suspension mechanism that is best illustrated in FIGURES 3 and 5–8. As is indicated in FIGURES 5 and 8, each suspension mechanism includes a generally L-shaped arm 22 that is pivoted at one end to the kingpin 21. From its connection to the kingpin 21, the arm 22 extends horizontally and then downwardly, terminating at its lower end in a collar 23 (FIGURES 3 and 6) in which is fixed one end of a shaft 24. Rotatably journaled on the shaft 24 is one end of a control arm 25, a bushing 26 being interposed between the arm 25 and the shaft 24. At the free end of the shaft 24 is fixed, by means of a pin 27, one end of a radius rod arm 28 about which more will be said subsequently. The opposite end of the control arm 25 is shaped to form a sleeve 29 having a bore 30 terminating in an end wall 31. The bore 30 receives a bushing 32 that journals one end of a tubular shaft or tube 33, the shaft 33 spanning the width of the wheeled unit 2 with its opposite ends received in the socket members or sleeves 29 at opposite sides of the unit.

Figure 6:
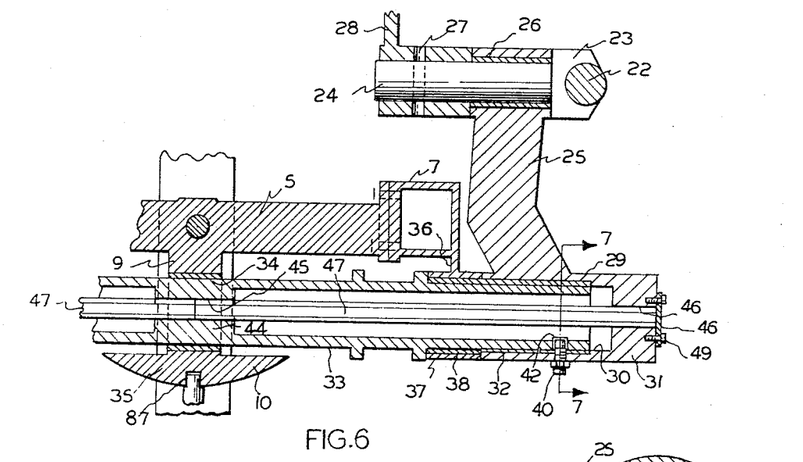
FIGURE 6 is a sectional view taken on the line 6—6 of FIGURE 5 and rotated counterclockwise 90°.
Figure 7:
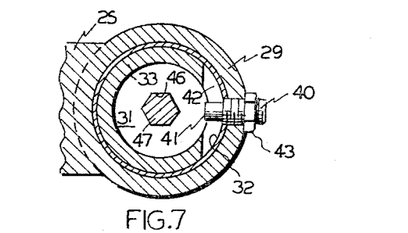
FIGURE 7 is an enlarged sectional detail, the section being taken on the line 7—7 of FIGURE 6.

As is best illustrated in FIGURE 6, the tubular shaft 33 projects through an opening 34 formed in the extension 9 of the frame member 5 and is journaled therein by means of a bushing 35. As also is best shown in FIGURE 6, each chassis mounting member 7 is provided with a forwardly projecting extension 36 terminating in a ring 37 that journals the shaft 33 by means of a bushing 38.

The tubular shaft or tube 33 is centered with respect to the control arms 25 at opposite sides of the unit 2 by the flanges 33a on the shaft 33, and retaining screws 40 (FIGURES 6 and 7) for the arms 25 thread into openings in the sleeve 29 at each side of the unit, the screws 40 each having a smooth inner end 41 that projects into a slot 42 formed in the adjacent end of the member 33. A lock nut 43 secures the screw 40 in adjusted position. The retaining screws 40 permit relative rotation between the shaft 33 and the members 29, but prevent axial movement of the members 29.

As is best illustrated in FIGURE 6, the mid-portion of the shaft 33 is provided with a core 44. The core 44 is provided with a preferably hexagonal bore 45 and the end wall 31 of each member 29 is provided with a similar bore 46. Received in the member 33 and extending in axial alignment therewith is a pair of torsion rods 47, each of which is of such cross-sectional shape as to correspond to the shape of the bores 45 and 46. The rods 47 abut one another in the core 44 and each rod is of such length as to project beyond the member 33 and into the bore 46 formed in the adjacent member 29. The rods 47 are maintained in assembled relation with the members 29 by end caps 48 secured to the end walls 31 by screws 49 or the like.

In order for the torsion bar suspension mechanism to function as a yieldable suspension mechanism, it is necessary that the rod members 47 be capable of rotating relatively to the shaft member 33 so as to twist or flex the torsion members 47. Since the members 47 are fixed with respect to the control arms 25, the member 33 must be fixed with respect to the frame of the unit 2. In the disclosed construction, adjusting means 50 (FIGURES 4 and 5) connects the member 33 to the frame in such manner as to permit relative rotation of the members 33 and 47 and to effect relative vertical adjustment of the frame member 5 and the wheels of each unit 2.

The adjusting means 50 comprises a yoke 51 composed of a pair of arms 52 and 53 (see FIGURE 4) that are connected to one another at substantially the longitudinal axis of the vehicle by a spindle 54. The other end of the arm 52 is welded or otherwise suitably secured to the tube 33, and the corresponding end of the arm 53 is similarly secured to the tube 33. Journaled on the spindle 54 is a sleeve 55 to which is fixed one end of an actuating bar 56. The actuating bar 56 includes a hollow, rectangular body 57 that is telescopingly received in a correspondingly shaped, tubular member 58 pivoted as at 59 (see FIGURE 5) to a bracket 60 that is mounted on the frame member 4. Journaled in the member 58 is a screw 61 that extends through a threaded opening formed in the base of the body member 57, the construction being such that the member 57 constitutes a nut mounted on the screw 61.

Means is provided for operating the adjusting means 50 by rotating the screw 61 and comprises a bevel gear 62 (see FIGURE 5) fast on the screw 61 and in mesh with a pinion 63 fast on a shaft 64 that is journaled in a bearing support 65 supported on the member 58. The shaft 64 is adapted to receive an actuating rod 66 that may be rotated in one direction or the other by a crank 67 so as to extend or retract the members 56 and 57 relative to the member 58.

Figure 3:
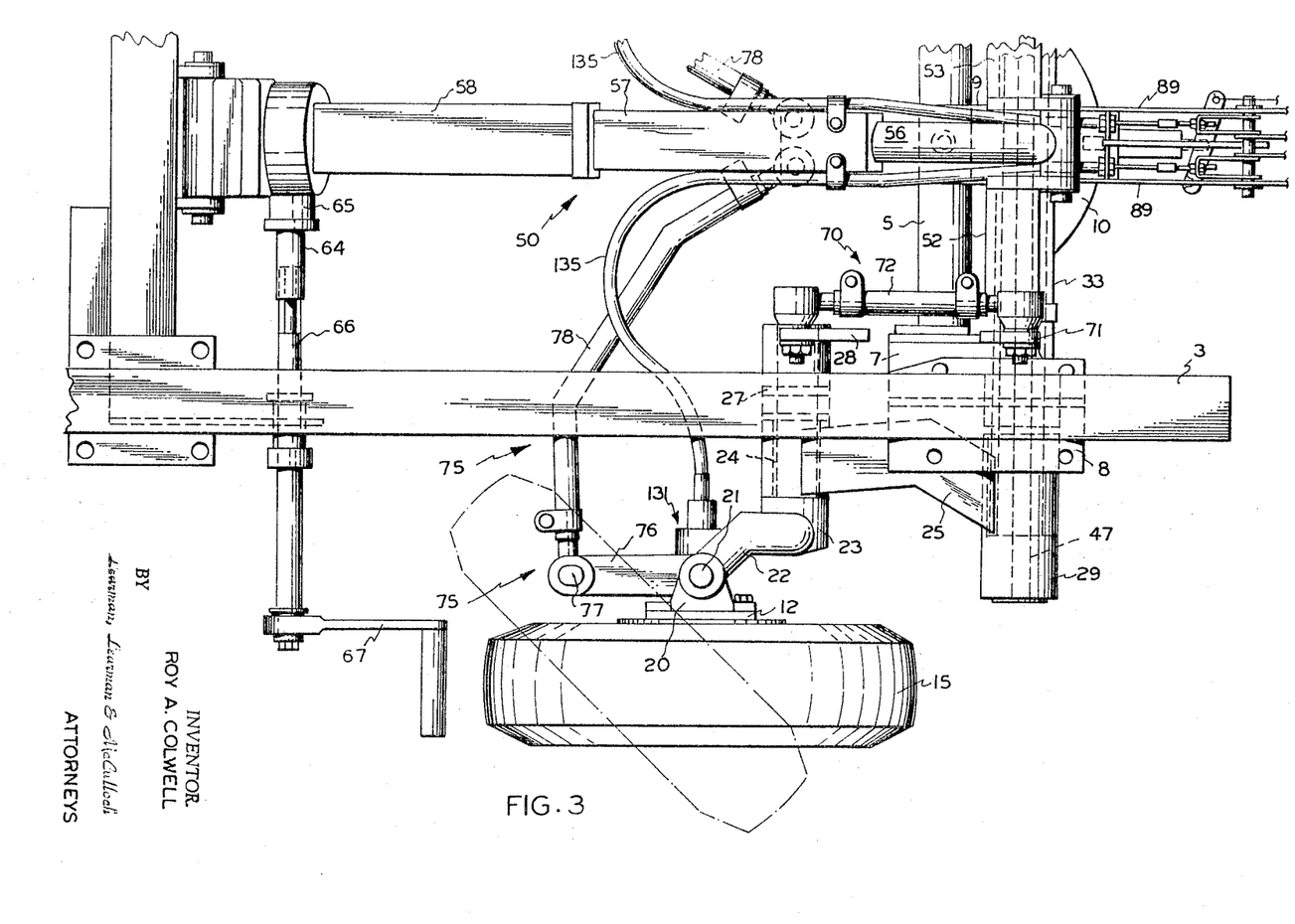
FIGURE 3 is a fragmentary, enlarged, top plan view of a portion of the apparatus shown in the lower right-hand part of FIGURE 2.
Figure 4:
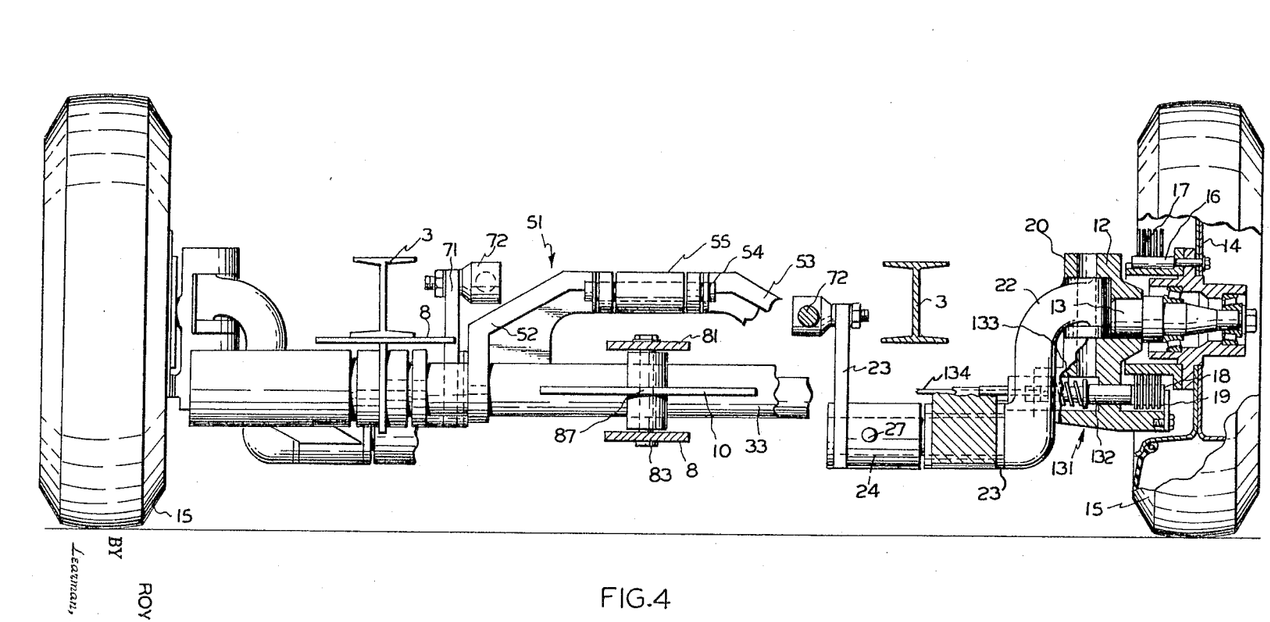
FIGURE 4 is an enlarged view partly in front elevation and partly in section of the vehicle, the section being taken on an irregular line.

The construction and arrangement of the adjusting mechanism 50 are such that rotation of the shaft 64 in such direction as to move the members 56 and 57 toward the left, as viewed in FIGURE 5, i.e., to retract the members 56 and 57 relative to the member 58, causes the arms 52 and 53 to be rocked counterclockwise in FIGURE 3 about the axis of the tube 33, thereby rocking the latter counterclockwise relative to the frame member 5. Such rocking of the tube 33 will be transmitted via the torsion rods 47 to the control arms 25 so as to cause the latter also to be rocked counterclockwise about the axis of the member 33. Such rocking of the control arms 25 will be resisted by the shafts 24 on which the arms 25 are journaled, inasmuch as the shafts 24 are supported a fixed distance above ground level by the arms 22. Since the shafts 24 cannot be urged any closer to ground level, the result of the imposition of the aforementioned counterclockwise force on the members 25 causes the latter to rock counterclockwise about the axis of the shafts 24 so as to elevate the frame member 5 with respect to the wheel journaling means 12. This result is illustrated in FIGURE 8, which discloses the frame member 5 and the chassis members 3 in elevated positions.

The relative vertical adjustment of the vehicle frame and the vehicle wheels is accomplished via the torsion suspension mechanism without imposing any stress on the latter greater than is imposed by the weight of the frame and the load supported thereby. That is, during raising or lowering of the vehicle frame, the tube 33 and torsion rods 47 are rocked as a unit. Consequently, relative vertical adjustment of the wheels and frame does not itself impose stress on the suspension system.

Rocking of each tube 33 by the adjusting mechanism 50 as described above causes relative rotation between the tubes and each of the supporting brackets 7 (see FIGURE 6). Since each member 7 is fixed to the frame member 5, however, there is no tendency of the support member 7 to tilt. Accordingly, the members 7 may serve as anchor members for means to brace the steering knuckles 20 in their vertical positions. The bracing means 70 comprises an anchor ear 71 (see FIGURES 3, 4, 5 and 8) secured to and projecting above each mounting member 7 and to which is pivotally connected one end of a connecting link 72. The other end of the link 72 is pivoted to the associated link 28 which, as has been pointed out hereinbefore, is pinned to the shaft 24. The members 25, 28, 71 and 72 constitute a pair of four-bar linkages for maintaining the steering knuckles 20 and the kingpins 21 vertical during relative movement of the wheel assembly and the frame.

Steering means 75 is provided to impart steering movements to the wheels of each unit 2 and comprises a steering arm 76 (FIGURES 3 and 5) fixed to each of the steering knuckles 20 and being pivoted as at 77 to one end of a tie rod 78. The other end of the tie rod 78 is pivoted to a rearwardly projecting flange 79 of a tongue assembly 80 having U-shaped upper and lower legs 81 and 82, respectively, that are pivotally mounted on the frame member 5 by a pivot pin 83. The forward portion of the tongue member 80 includes a forwardly extending tubular portion 84 (see FIGURE 5) in which is reciprocably mounted a plunger 85 terminating at its rearward end in an enlarged locking tooth 86 that is adapted to be received in a notch 87 formed in the arcuate member 10. The tooth 86 is constantly urged rearwardly by a spring 88 that is received in a tubular member 84 and surrounds the member 85.

Figure 9:
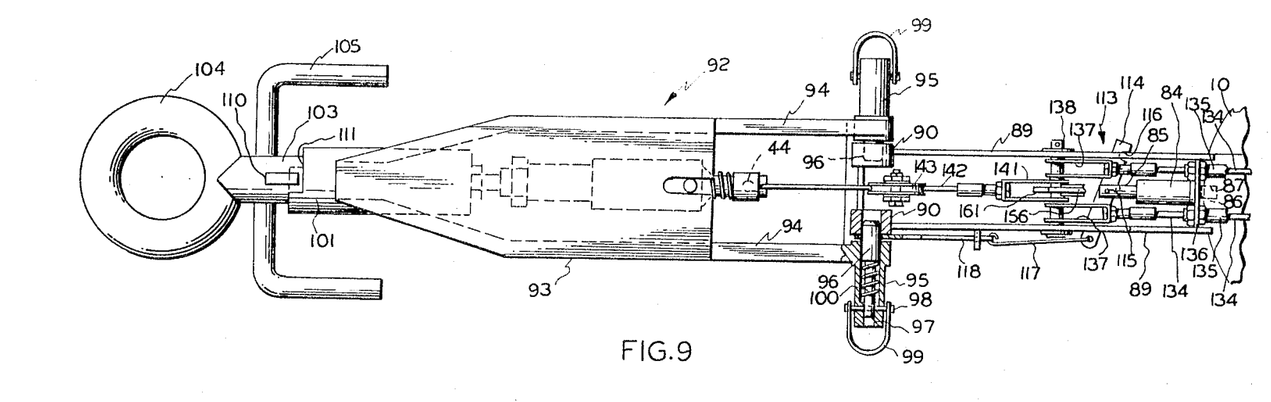
FIGURE 9 is a top plan view, partly in section and on an enlarged scale, of the drawbar and tongue assemblies at either end of the vehicle.
Figure 10:
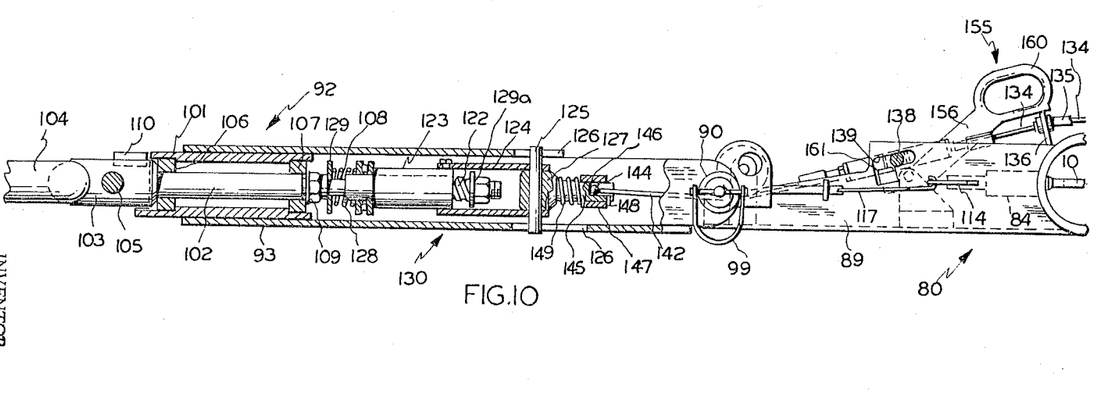
FIGURE 10 is a view partly in side elevation and partly in section of the apparatus shown in FIGURE 9.

The tongue member 80 also includes a forwardly extending channel member having a pair of side flanges 89 (see FIGURES 9 and 10). At their forward ends, each flange 89 is provided with a socket member 90 which will be referred to in more detail hereinafter.

The construction and arrangement of the steering apparatus is such that pivotal movements of the tongue assembly 80 about the axis of the pivot pin 83 effects swinging movement of the flange 79 to which the tie rods 78 are pivoted. Such swinging movement of the flange 79, is imparted to the tie rods 78 and, via the steering arms 76, to the steering knuckles 20 so as to swivel the wheels about the substantially vertical axis of the kingpin 21. As is indicated in FIGURES 5 and 8, the tie rods 78 are pivoted to the steering arms 76 and to the tongue flange 79 in such manner as to permit the tie rods to adjust during relative vertical movement of the wheels and the unit frames.

The steering tongue 80 is adapted to be selectively connected to and disconnected from a drawbar assembly 92 which is best illustrated in FIGURES 9 and 10. The drawbar assembly comprises a hollow housing 93 terminating at its rearward end in a pair of parallel flanges 94 on each of which is mounted a laterally extending boss 95. In each boss 95 is a reciprocable latch bolt 96 having a stem 97 connected by a pin 98 to a bail or handle 99. The bolts 96 normally are urged toward one another by springs 100. The drawbar assembly 92 may be movably connected to the tongue 80 by inserting the bolts 96 in the socket members 90.

At the forward end of the drawbar housing 93 is fixed a sleeve 101 in which is rotatably journaled a shaft 102 having an enlarged portion 103 projecting beyond the sleeve 101 and being welded or otherwise suitably fixed at its forward end to a coupling ring 104. Secured to the shaft portion 103 is a substantially U-shaped handle 105 to facilitate manual manipulation of the drawbar. The means for journaling the shaft 102 comprises a thrust bearing 106 fitted in the sleeve 101 adjacent the forward end of the latter and engaging the enlargement 103, and a second, similar bearing 107 fitted in the sleeve 101 at its rearward end. To the rear end of the shaft 102 is joined a threaded extension 108 having a nut and washer assembly 109 thereon which reacts with the bearing 107 to prevent relative longitudinal movement of the housing 93 and the shaft 102. Rotation of the shaft 102 relative to the housing 93 is limited by a stop member 110 mounted on the shaft enlargement 103 and adapted to engage the terminal ends of a notch 111 formed in the forward end of the sleeve 101.

The towbar 92 is adapted to be used only when it is desired to couple the vehicle 1 to a towing vehicle or to tow another vehicle behind the vehicle 1. When the vehicle 1 is to be towed, the wheels of the leading unit 2 preferably should be steerable. For such wheels to be steerable, the lock tooth 86 must be withdrawn from the notch 87 in the arcuate member 10. In the disclosed embodiment, means for disabling the steering latch mechanism is designated generally by the reference character 113 (FIGURES 9 and 10) and comprises a lever 114 extending through openings formed in the tongue flanges 89 and pivoted as at 115 to the plunger 85. One end of the lever 114 is notched as at 116, the notch constituting a pivot or fulcrum for the lever. The other end of the lever 114 is connected to one end of a link 117, the opposite end of which is connected to a slide bar 118. The forward end of the bar 118 (see FIGURE 13) is joined to a triangular latch plate 119 having a finger opening 120 to facilitate sliding the bar 118 forwardly and rearwardly. The plate 119 also has an opening 121 therein.

As is best shown in FIGURE 9, the plate 119 is adapted to be interposed between one of the towbar bosses 95 and the adjacent socket member 90 with the opening 121 in alignment with the openings in the members 90 and 95 so as to receive therein the associated latch bolt 96. When the plate 119 is in a position to accommodate the bolt 96 in the opening 121, the lever 114 will have been rocked to the position shown in FIGURE 9 in which the tooth 86 is withdrawn from the notch 87. In these positions of the parts, the drawbar and the tongue are capable of pivoting about the axis of the pin 83 so as to impart steering movements to the associated wheels.

The towbar 92 preferably includes so-called dead man actuating means operable to normally effect application of the wheel brakes of the associated unit 2 but to maintain the brakes in a released or disengaged condition when the vehicle 1 is being towed. The actuating means 130 (see FIGURE 10) comprises a threaded screw member 122 fixed to the shaft 102 and on which is mounted a ball nut member 123. The screw 122 rotates with the shaft 102 but the nut 123 is restrained against rotation by being fixed to a sleeve 124 that carries a guide pin 125 which is received in slots 126 provided in the housing 93. The pin 125 also secures an anchor member 127 to the sleeve 124. The nut 123 and the members 124–127 associated therewith constantly are urged in a rearward direction by a spring 128 which surrounds the shaft 108 and reacts between the nut 123 and a washer 129. Rearward movement of the nut 123 is limited by a washer 129a carried at the rear end of the screw 122.

Figure 11:
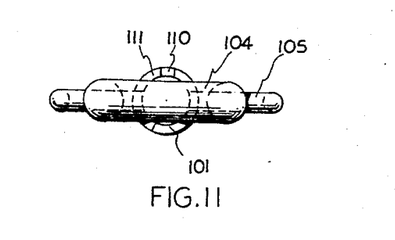
FIGURES 11 and 12 are enlarged end elevational views of the drawbar illustrating the brake disabling and brake applying positions, respectively, of the drawbar.
Figure 12:
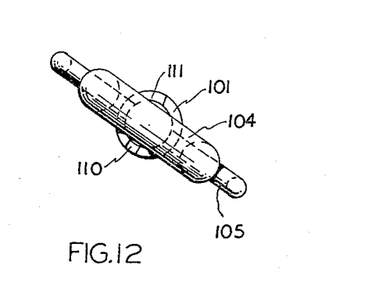

The force of the spring 128 normally is sufficient to maintain the nut 123 against the washer 129a. In this position of the washer the coupling ring 104 will be in the inclined position indicated in FIGURE 12. Upon rotation of the ring 104 to the position shown in FIGURE 11, however, the nut 123 and its associated parts will be moved to the positions shown in FIGURE 10. When the ring 104 is free, the force of the spring 128 is such as to be capable of urging the nut 123 rearwardly, thereby rotating the shaft 102 and the ring 104 to the position shown in FIGURE 12.

Apparatus constructed according to the invention includes brake operating means 131 adapted to be operated by the actuating means 130. The operating means 131 comprises an operating rod 132 (see FIGURE 4) that is reciprocably mounted in the associated steering knuckle 20 and in a position to engage the inner brake plate 18. The rod 132 normally is urged by a powerful compression spring 133 in such direction as to cause the brake disks 17 and the plates 18 to engage one another frictionally to restrain rotation of the wheel. To the rod 132 is connected one end of an actuating cable 134, the cable being received in a cable housing 135 which extends from the wheel inwardly toward the longitudinal center of the vehicle and forwardly toward and beyond the front frame member 5.

As is most clearly illustrated in FIGURES 3 and 9, the brake cable housings 135 from the two wheels of a unit 2 are secured to a cross bar 136 that is supported between and slightly above the side flanges 89 of the tongue member 80. The brake cables 134, however, continue forwardly of the plate 136 and are secured to anchor members 137. The members 137 are provided with aligned openings through which extends a shaft 138 (FIGURES 9 and 10), the ends of the shaft 138 projecting through elongated slots 139 formed in the flanges 89. Between the anchor members 137 is a similar anchor member 141 that also is connected to the shaft 138 and to which is connected one end of a force transmitting cable 142. The cable 142 passes under a pulley 143 mounted at the forward end of the tongue member 80 and terminates at its forward end in an enlarged, spherical bead 144.

The bead 144 is adapted to be separably connected to the anchor member 127 and for this purpose the latter is provided with a rearwardly extending projection 145 having a keyhole slot 146 at its rearward end of such size as to accommodate the bead 144 and the adjacent end of the cable 142. Inadvertent removal of the bead 144 from the slot 146 is prevented by a retaining ring 147 that is slidably mounted on the extension 145 and urged into engagement with a stop pin 148 and in overlying relation with the slot 144 by a spring 149.

The construction and operation of the brake operating mechanism is such that when the ball nut 123 and the sleeve 124 of the actuating mechanism 130 are in their forward positions, as illustrated in FIGURE 10, the cables 142 and 134 are taut and hold the brake operating rods 132 in their disabled positions against the force of the springs 133 so as to maintain the brakes in disengaged or released condition. Rearward movement of the ball nut 123 and its associated parts, however, enables the cables 132 to slacken, thereby enabling the springs 133 to engage the wheel brakes.

Manually operable means 155 (see FIGURES 10 and 13), is provided for maintaining the wheel brakes of each unit 2 disabled or disengaged and comprises a lever 156 pivoted at 157 between its ends on a bracket 158 that is supported on the tongue member 80. One end of the lever is provided with a handle 160 and the other end of the lever includes an upstanding leg 161. The bracket 158 is so located that the lever 156 extends between the pair of cable anchor members 137 and rearwardly of the shaft 138 so as to avoid interfering with the fore and aft movement of the latter.

Figure 13:
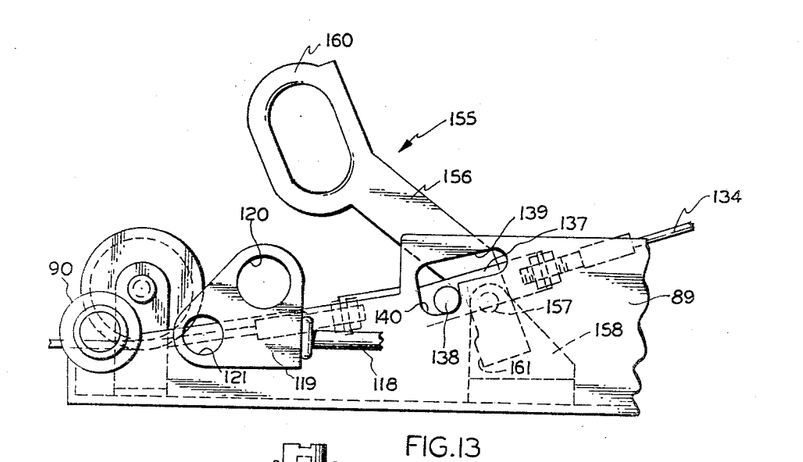
FIGURE 13 is a fragmentary, enlarged, side elevational view of manually operable brake control mechanism forming part of the invention.

In the inactive or disabled position of the lever 156, as shown in FIGURE 10, the leg 161 provides a support for the shaft 138 to prevent the latter from moving into the leg 140 of the slot 139. Upon counterclockwise rocking of the lever 156, however, the latter bears against the shaft 138 and cams the latter forwardly of the vehicle and into the leg 140 of the slot 139 as is shown in FIGURE 13. The body of the lever 156 then overlies the shaft 138 and prevents inadvertent upward movement of the latter. When the shaft 138 is received in the slot 140, the brake cables 134 are taut and the brake operating members 132 are maintained in their disabled positions, thereby holding the brakes in their disengaged positions regardless of the position of towbar ring 104 or whether the towbar is in attached position. To reset the brakes, it is necessary only to rock the lever 156 clockwise from the position shown in FIGURE 13, whereupon the leg portion 161 will engage and lift the shaft 138 to a position in which it is able to clear the slot 140, at which time the springs 133 are enabled to act on the brake operating members 132 to apply the wheel brakes.

Figure 1:
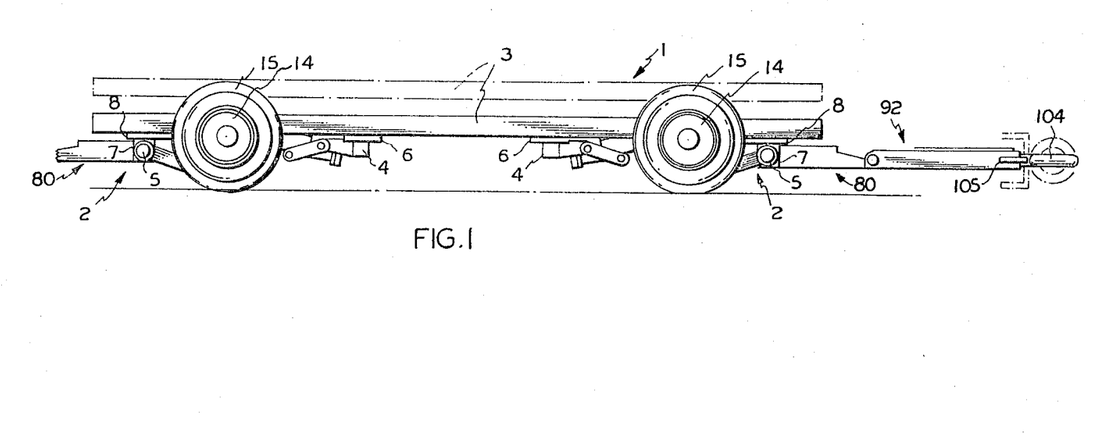
FIGURE 1 is a side elevational view of a trailer vehicle constructed in accordance with the invention, the chain lines representing different positions of adjustment of certain parts of the apparatus.
Figure 2:
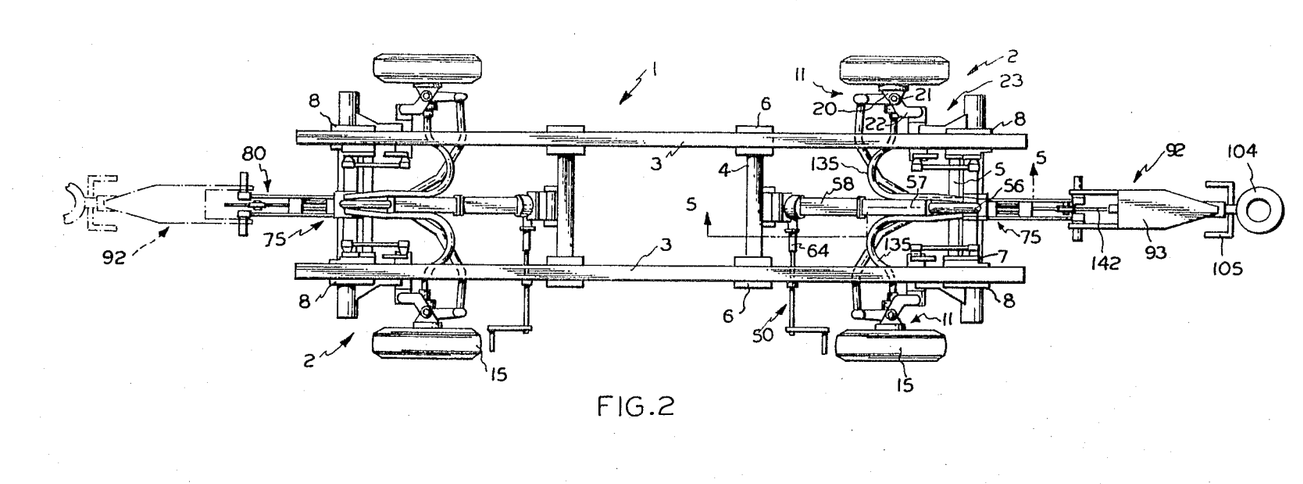
FIGURE 2 is a top plan view of the apparatus shown in FIGURE 1.

To condition the apparatus for use, the load supporting members 3 may be mounted on a pair of units 2 arranged in tandem as is indicated in FIGURES 1 and 2. If the vehicle is to be towed behind a tractor, a towbar assembly 92 should be connected to one of the members 2 and the force transmitting cable 142 connected to the actuating mechanism 130 in the manner previously described so as to enable the brakes of that unit to be maintained in a disengaged condition when the coupling member 104 is connected to the towing vehicle. When connecting the towbar 92 to the tongue member 80 of the leading unit 2, the latch plate 119 should be connected to the associated latch bolt 96 so as to retract the tooth 86 from the notch 87 in the arcuate member 10 and enable the wheels of the leading unit to be steered.

If but one vehicle 1 is to be towed behind a towing vehicle, there will be no need to provide a towbar 92 at the rear end of the vehicle. Under these conditions, the tongue 80 of the rear unit 2 will be restrained against swiveling movement by engagement of its tooth 86 in the notch 87 of the associated arcuate member 10, and the manually operable brake control means 155 will be in brake releasing position, as illustrated in FIGURE 13, so as to enable the wheels of the rear unit to rotate.

When more than one vehicle 1 is to be towed behind a towing vehicle, the rear towbars 92 of the vehicles behind the towing vehicle are disconnected and pintle adaptor members generally designated 162 (see FIGURES 14 and 15) are mounted in position in place of each of them except in the case of the rear vehicle. Each member 162 includes a pair of vertically spaced horizontal plates 163 and 164 welded to a channel-shaped (in plan) section 165 which incorporates transversely extending, elongated bosses 166. In each boss 166 is a reciprocable latch bolt 167 having a stem 168 connected by a pin 169 to a bail or handle 170. The bolts 167 normally are urged toward one another by springs 171 and, as with the drawbar assembly 92, each adaptor 162 may be movably connected to the tongue 80 by inserting the latch bolts 167 in the socket members 90. It will be seen that the bosses 166 also include vertically arranged notches 172 so that when the bolts 167 are pulled outwardly and rotated through 90° the pins 169 can be engaged in the slots 172 to thereby retain the bolts 167 in outward position.

Figure 14:
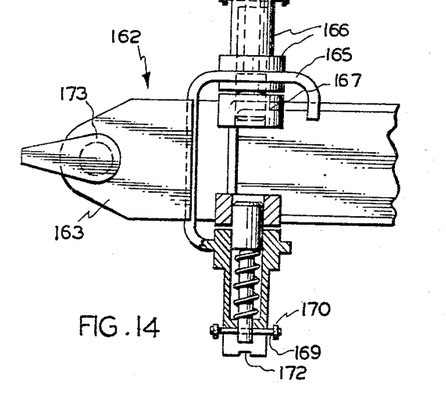
FIGURE 14 is a top plan view showing a pintle adaptor member which is connected in place of the detachable towbars on the vehicles following the leading towed vehicle when several or more vehicles are towed in a train.
Figure 15:
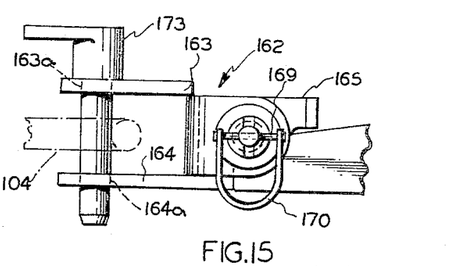
FIGURE 15 is a side elevational view thereof.

The lunette ring 104 of the vehicle being towed in each instance is received between the plates 163 and 164 and openings 163a and 164a are provided in the forward plates 163 and 164, respectively, to receive a vertical pin 173 which removably secures the ring 104. In order to disconnect the rear towbars 92 it is, of course, necessary to detach the cables 142 from the towbars which are to be removed. This is done after the levers 160 of the particular towbar assemblies are pulled toward the rings 104 to "lock out" or disable the brakes on the rear wheels 15 of each vehicle 1 which is to tow another vehicle.

As the vehicle 1 is toward along a road or other surface, the torsion suspension system for the wheels enables the load supported by the vehicle to be cushioned against jars and road shocks so as to minimize the risk of injuring the load being transported.

If it should be desired to raise or lower the load supporting members 3 of the vehicle for loading or unloading operations, the cranks 67 of the leading and trailing units 2 may be rotated in the appropriate direction so as to effect adjustment of the telescoping adjusting mechanism 50, conjoint rocking of the torsion members 33 and 47, and rocking of the control arms 25 so as to effect raising or lowering of the frame members 4 and 5 relatively to the vehicle wheels.

The disclosed embodiment is representative of a presently preferred form of the invention, but is intended to be illustrative rather than definitive thereof. The invention is defined in the claims.

What is claimed is:

1. A towbar construction for use with a wheeled trailer vehicle, said construction comprising a body member; means on said body member for mounting the latter on said vehicle; a coupling member for connecting said body member to a towing vehicle; means rotatably mounting said coupling member on said body member; anchor means mounted on said body member for reciprocating movements; and means interconnecting said coupling member and said anchor means for reciprocating the latter in response to rotation of said coupling member.

2. The construction set forth in claim 1 including means constantly acting on said anchor means and urging the latter to move in one direction and urging said coupling member to rotate in one direction.

3. The construction set forth in claim 2 including stop means reacting between said body member and said coupling member for limiting rotation of the latter in said one direction.

4. The construction set forth in claim 1 wherein said anchor means comprises a member having a slot therein; cover means slideably mounted on said member for movements from a first position in which said slot is closed to a second position in which said slot is open; and means acting on said cover means and urging the latter to said first position.

5. A trailer vehicle having frame means; wheel means; means mounting said wheel means on said frame means for steering movements; steering means connected to said wheel means; locking means interconnecting said steering means and said frame means for disabling steering movement of said wheel means; towbar means for connecting said vehicle to a towing vehicle; means connecting said towbar means to said steering means; means cooperable with said towbar means and said locking means for adjusting the latter between operative and inoperative positions; and latch means connected to said locking means and cooperable with said connecting means to maintain said locking means in its said inoperative position.

6. In a vehicle having frame means, rotatable wheel means; brake means operable to restrain rotation of said wheel means; towbar means on said frame means movable to a position for engaging a motive vehicle and to a disengaged position; means connecting said brake means and towbar means operated by said towbar means to apply said brake means when said towbar means is in disengaged position and to release said brake means when the towbar means is in engaging position; and means selectively operative to disable the means connecting the brake means and towbar means independently of the towbar means; said means connecting said brake means and tow bar means comprising a cable system and means interposed therein for selectively manually rendering said cable system slack or taut; said tow bar means being detachably connected to said frame means and said cable system being detachably connected to said tow bar means.

7. In a vehicle; longitudinally extending frame means; ground engaging, motive, vehicle support means at the sides thereof; a torsion suspension member extending transversely inwardly from said ground engaging means at each side; a longitudinally adjustable member rigidly mounted by said frame means between said torsion members for longitudinal movement relative to said torsion members; a connecting section rigidly connecting said longitudinal member and each of said torsion members; and link means connecting one of said torsion members and ground engaging means at each side in a manner to transfer torsional forces created by longitudinally adjusting said longitudinally adjustable member to said ground engaging means and raise said frame means relative to said ground engaging means.

8. The combination defined in claim 7 wherein said longitudinally adjustable member and frame means are connected by a screw and nut connection.

9. The combination defined in claim 7 wherein said link means includes transversely extending shaft means supported rigidly by said frame means between said torsion member and ground engaging means at each side; a link fixed to each torsion member pivoted on said shaft means; and a second link at each side connecting with said ground engaging means and pivotal on said shaft means.

10. The combination defined in claim 9 in which steering knuckles are connected to said ground engaging means by vertical kingpins and said combination includes parallel linkage means maintaining the steering knuckles and kingpins in vertical position during relative movement of said ground engaging means and frame means.

11. The combination defined in claim 7 in which tow bar means is pivotally connected to said frame means for steering movements in a longitudinal plane; brake means is provided for said ground engaging means; means connects said tow bar means and ground engaging means for steering movements; steering disabling means in one position connecting said tow bar means and frame means to prevent steering movements of said tow bar means relative to said frame means; means normally urges said steering disabling means to said position to disable said steering movements; coupling means for attaching said tow bar means to a towing vehicle is mounted by said tow bar means for axial rotation; reciprocating means operated by rotation of said coupling means; cable means connecting said reciprocating means and brake means; means normally holding said steering disabling means out of said position; and means for selectively conditioning said cable means to hold said brakes out of operation.

12. In a trailer vehicle; frame means; ground engaging, motive, vehicle support means for said frame means; a coupling member for connecting said frame means to a towing vehicle mounted for axial rotative movement; means connected with said coupling member and mounted for reciprocating movement in response to rotation of said coupling member; brake means for said ground engaging means; and means connecting said brake means and reciprocating means to control applying and disabling of said brake means dependent on the position of said reciprocating means.

13. The combination defined in claim 12 in which said reciprocating means comprises a nut and said coupling has a threaded shaft cooperative therewith.

14. The combination defined in claim 12 in which said means connecting said brake means and reciprocating means comprises a cable system; and means is provided for disabling said cable system to render said brake means disabled regardless of the position of said reciprocating means.

15. The combination defined in claim 12 in which means normally urges said coupling member to rotate in one direction.

16. In a trailer vehicle; generally longitudinally extending frame means; ground engaging motive vehicle support means for said frame means; tow bar means connected to said frame means for steering movements in a generally longitudinal plane; means connecting said tow bar means and ground engaging means to transmit steering movements to said ground engaging means; coupling means for connecting said tow bar means to a towing vehicle releasably coupled to said tow bar means; steering disabling means normally urged to a position in which it prevents steering movements of said tow bar means relative to said frame means; and means releasably maintaining said coupling means in coupled position also maintaining said steering disabling means in a position in which it does not prevent said steering movements.

17. In a trailer vehicle; generally longitudinally extending frame means; ground engaging, motive, vehicle support means for said frame means; tow bar means connected to said frame means for steering movements in a generally longitudinal plane; means connecting said tow bar means and ground engaging means to transmit steering movements to said ground engaging means; steering disabling means; means normally urging said steering disabling means to a position in which it prevents steering movements of said tow bar means relative to said frame means; and releasable means operable to overcome the effects of said urging means and move said steering disabling means to a position in which it does not prevent said steering movements.

18. In a vehicle having frame means, rotatable wheel means; brake means operable to restrain rotation of said wheel means; tow bar means on said frame means movable to a position for engaging a motive vehicle and to a disengaged position; means connecting said brake means and tow bar means operated by said tow bar means to apply said brake means when said tow bar means is in disengaged position and to release said brake means when the tow bar means is in engaging position; and means selectively operative to disable the means connecting the brake means and two bar means independently of the tow bar means; said tow bar means, said means connecting said brake means and tow bar means, and said selectively operative means being provided at both the front and rear ends of the vehicle frame means; the rear tow bar means being detachably connected to said frame, and an adapter member having attachment means which are always in attaching position being substitutable therefor.

19. In a trailer vehicle; a generally longitudinally extending frame means; ground engaging, motive, vehicle support means for said frame means; brake means for said ground engaging means; tow bar means connected to said frame means; brake controlling means on said tow bar means, movable between a first position in which it disables said brake means and a second position in which it permits application of said brake means; a cable system connecting said brake controlling means on said two bar means with said brake means; means, normally urging said brake means to a brake applying position, disableable when said brake controlling means is moved to said first position and said cable system overcomes the effect of said urging means; and length adjusting means connected in said cable system and movable to a position in which said cable system is effectively shortened and said brake means remain disabled when said brake controlling means is in said second position.

20. The combination defined in claim 19 in which said cable system includes link means connecting with said brake controlling means and comprising said length adjusting means; said link means being movable from one position to another to change the effective length of the cable system.

21. The combination defined in claim 20 in which said cable system includes a pair of cable ends; and said link means includes a cross member on said tow bar means to which said ends are attached; and means for moving said cross member longitudinally on said tow bar means.

22. The combination defined in claim 21 in which said latter moving means comprises a pivotal latch and said cross member is moved in slot means in said tow bar means having an offset locking recess in which said cross member may be received to anchor said cable system and hold said brake means in disabled condition.

References Cited by the Examiner
UNITED STATES PATENTS

| | | | |
|---|---|---|---|
| 1,385,361 | 7/1921 | Clement | 280—445 |
| 1,412,120 | 4/1922 | Lee | 280—445 |
| 2,138,267 | 11/1938 | Christenson | 188—3 X |
| 2,191,211 | 2/1940 | Krotz | 280—43.18 X |
| 2,192,055 | 2/1940 | Tuft et al. | 188—3 |
| 2,192,384 | 3/1940 | Nielsen et al. | 188—3 |
| 3,029,090 | 4/1962 | Wilfert et al. | 280—124 |
| 3,134,461 | 5/1964 | Klemm et al. | 188—9 |
| 3,212,789 | 10/1965 | Stotz et al. | 280—124 |

LEO FRIAGLIA, *Primary Examiner.*